United States Patent Office 3,523,899
Patented Aug. 11, 1970

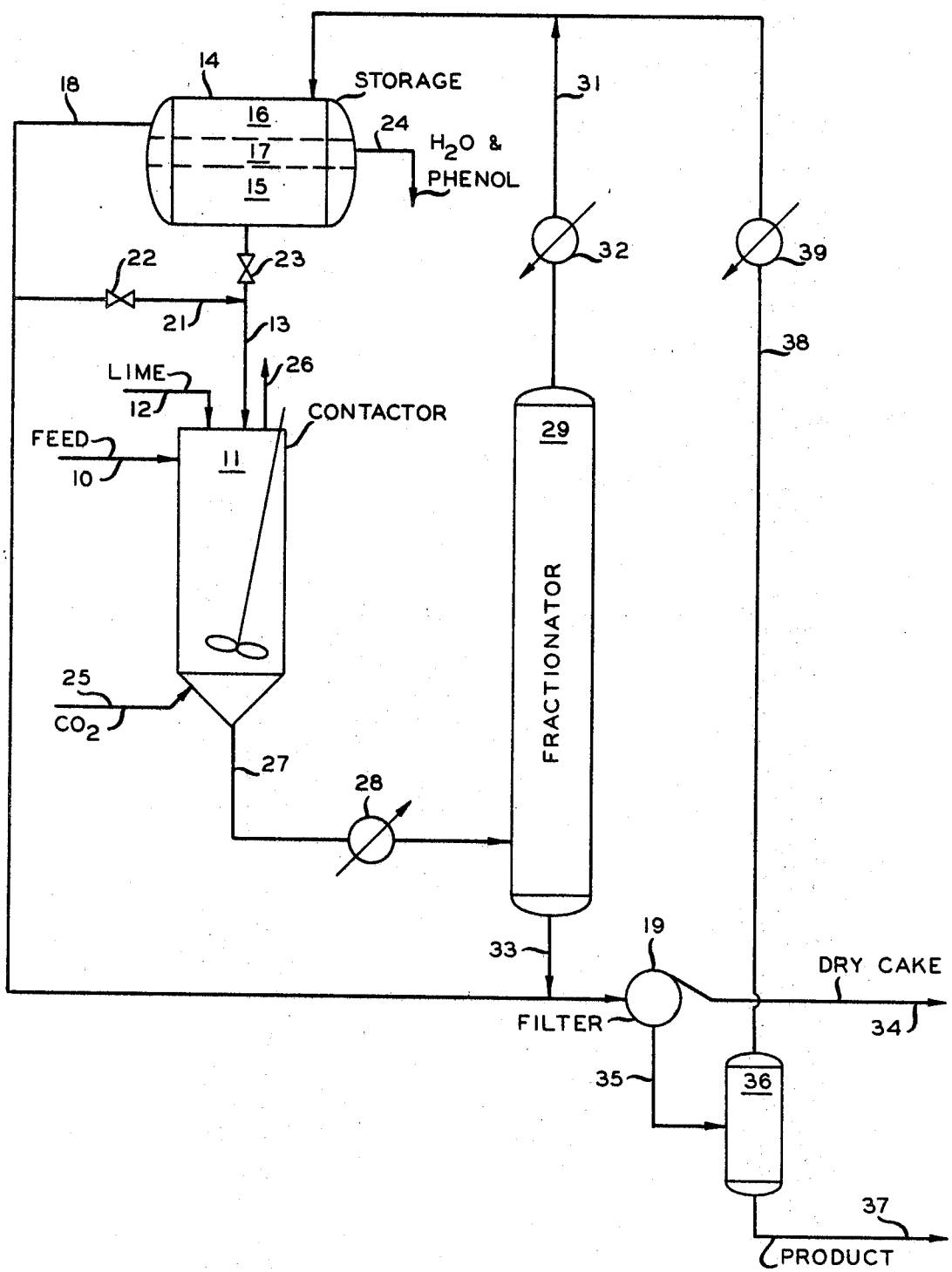

3,523,899
OVERBASED METAL PETROLEUM SULFONATE AND METHOD FOR ITS PREPARATION
Albert N. De Vault, Bartlesville, Okla., assignor to Phillips Petroleum Company, a corporation of Delaware
Filed Apr. 4, 1966, Ser. No. 540,022
Int. Cl. C10m 1/10, 1/40
U.S. Cl. 252—33          10 Claims

ABSTRACT OF THE DISCLOSURE

Overbased metal sulfonates are formed by reacting a sulfonic acid or metal salt thereof with carbon dioxide in a critical reaction medium which consists of phenol, water, and petroleum solvent. The inventive sulfonates are used as detergents in lubricating oils.

---

This invention relates to an overbased metal petroleum sulfonate. In one of its aspects it relates to an overbased calcium petroleum sulfonate and to a method for its preparation. In another aspect the invention relates to an overbased calcium petroleum sulfonate prepared by treating a petroleum sulfonic acid and/or a calcium petroleum sulfonate with lime and carbon dioxide in the presence of a mixture of phenol and water.

The product of this invention has particular utility in adding detergency to lubricating oils.

Metal petroleum sulfonates are widely used in the manufacture of additives for lubricating oil used in internal combustion engines. These materials impart detergency to such lubricating oils and thus assist in keeping internal parts clean and in reducing sludge formation in the oil. The detergency is destroyed and lost as acids formed from combustion products are neutralized by the basic petroleum sulfonates and when the detergency is thus destroyed the acids are free to attack the metal of the engine parts. In order to prolong the life of such additives the alkaline reserve of the oil composition is often increased. The alkaline reserve is usually measured by total base number (TBN) which can be defined as the number of milligrams of potassium hydroxide equivalent to the amount of acid required to neutralize the alkaline constituents present in one gram of sample to a final pH of 4. A metal petroleum sulfonate having a TBN higher than that which can be obtained by simply neutralizing the sulfonic acid is said to be "overbased."

I have found that a metal petroleum sulfonate, for example a calcium petroleum sulfonate, can be overbased by treating the calcium petroleum sulfonate with lime and carbon dioxide in a petroleum hydrocarbon solvent-water-phenol reaction medium. I have also found that both neutralization and overbasing can be effected by treating a petroleum sulfonic acid with lime and carbon dioxide in a petroleum hydrocarbon solvent-water-phenol reaction medium.

Phenol is often referred to as carbolic acid, monohydroxy benzene or phenic acid.

Petroleum solvents which are applicable for use in the process of this invention include petroleum naphtha, Stoddard solvent, kerosene, heptane, toluene, benzene, cyclohexane, and the like. Any of the liquid hydrocarbons commonly utilized as solvents are applicable in the practice of this invention.

The concentration of the phenol in the mixture must be greater than about 1 percent of the naphtha and should be at least about 2 percent and preferably from about 3 to 10 percent although greater amounts of phenol can be utilized if desired. The phenol-water mixture will usually contain from about 50 to 90 volume percent phenol and will usually be at the equilibrium ratio for the prevailing temperature. Thus the phenol-water mixture will often be composed of about 70 volume percent phenol and about 30 volume percent water.

Although any of the metal petroleum sulfonates or sulfonic acids normally used as lube oil additives or used in the preparation of lube oil additives can be utilized in the practice of this invention, a particularly preferred feedstock for the process is prepared from a propane-fractionated, solvent-extracted and dewaxed intermediate based bright stock of about 200 to 230 SUS at 210° F. and having a viscosity index of at least about 85. The preparation of metal petroleum sulfonates from such feedstock is described in U.S. Pat. 3,135,693, issued June 2, 1964.

In the drawing a stream of petroleum sulfonic acid, as described above, is introduced via conduit 10 into contactor 11. Lime [$Ca(OH)_2$] is added via conduit 12, and a petroleum naphtha-water-phenol reaction medium is added via conduit 13. Storage container 14 contains in the lower part thereof a phenol-water layer 15 comprising 70 percent phenol and about 30 percent water by volume. In the upper part of the container is a petroleum naphtha layer 16 and intermediate these two layers is a water-phenol layer 17 comprising about 90 percent water and about 10 percent phenol by volume. A phenol-water stream is withdrawn from layer 15 via conduit 13. Naphtha is withdrawn via conduit 18 to a filter 19 as diluent as hereinafter described. A portion of the naphtha of conduit 18 is passed via conduit 21 to conduit 13. The relative volumes of naphtha and phenol-water streams are controlled by valves 22 and 23. Water-phenol mixture is withdrawn from layer 17 and passed via conduit 24 to a phenol recovery system (not shown). Carbon dioxide is introduced into contactor 11 via conduit 25 and excess carbon dioxide is vented via conduit 26.

The effluent from contactor 11 is passed via conduit 27 and heater 28 to fractionator 29 at a temperature of about 400 to 410° F. The reaction medium comprising naphtha, phenol and water is removed overhead via conduit 31, condensed in cooler 32 and returned to storage container 14.

Substantially water-free overbased calcium petroleum sulfonate is removed as bottoms product via conduit 33, diluted with naphtha in conduit 18 and passed to filter 19. Filter cake comprising lime, calcium carbonate and filter aid is discarded via conduit 34. The filtrate comprising naphtha and overbased calcium petroleum sulfonate is passed via conduit 35 to stripper 36 where product is recovered via conduit 37 and naphtha is recycled to storage container 14 via conduit 38 and cooler 39.

The operation is the same when a calcium petroleum sulfonate is the feed stream introduced into contactor. In either event sufficient lime is added so that there is always an excess of lime present in the contactor.

The following examples will be helpful in attaining an understanding of the invention; however, the examples are intended to be illustrative and should not be construed so as to limit the invention unduly.

EXAMPLE I

A run was made in which about 487 parts by weight of sulfonic acid, prepared by sulfonating a bright stock described in U.S. 3,135,693 by the process described in U.S. 3,135,693, were contacted with about 100 parts by weight of lime ($Ca(OH)_2$) in about 772 parts by weight of petroleum naphtha and about 53 parts by weight of a mixture of phenol and water containing about 70 volume percent phenol and about 30 volume percent water. Contacting was for 35 minutes at atmospheric pressure and temperature, and carbon dioxide was bubbled through the stirred mixture during the contact period.

Most of the reaction mixture was then removed by heating to 410° F. About 1544 parts by weight of petroleum naphtha were added and the mixture was filtered to remove solids. The filtrate was stripped of naphtha by heating to 410° F. with nitrogen stripping. The TBN value of the product was 161.

EXAMPLE II

The process of Example I was repeated except that 50 parts by weight of phenol and 10 parts by weight of water were used. It was noted that no reaction was obtained until the water was added. The TBN value obtained was 166.

EXAMPLE III

The process of Example I was repeated except that 39 parts by weight of water saturated with phenol and containing about 11 parts by weight of phenol was used. The TBN value obtained was 1.4.

EXAMPLE IV

A reaction mixture similar to that of Example II was stirred for 30 minutes in the absence of carbon dioxide, heated to 260° F. for 1 hour with nitrogen stripping to remove water, blown with carbon dioxide for 3 hours at 260° F., filtered and stripped. The TBN value obtained was 15.7.

The data of Examples I and II show that calcium petroleum sulfonates having quite high base numbers are obtained by the process of the invention. The data of Example III show that the phenol concentration must be greater than 0.5 to 1 percent of the naphtha. The data of Example IV show that treating with carbon dioxide after water removal does not result in a high TBN.

That which is claimed is:

1. A method for producing an overbased calcium petroleum sulfonate which comprises contacting a calcium petroleum sulfonate or a petroleum sulfonic acid with an excess of calcium hydroxide and carbon dioxide in a reaction medium comprising a petroleum solvent and a phenol-water mixture for a time sufficient to increase the metal content of the sulfonate substantially, wherein the amount of phenol in the reaction medium is at least about 1 percent of the petroleum solvent and the phenol-water mixture contains 50–90 volume percent of phenol; and recovering an overbased sulfonate from the reaction medium.

2. The method of claim 1 wherein the calcium petroleum sulfonate is derived from a propane-fractionated, solvent-extracted and dewaxed intermediate base bright stock having a viscosity of about 200 to 230 SUS at 210° F. and having a viscosity index of at least about 85.

3. The process of claim 1 wherein the phenol-water mixture contains from about 50 to 90 volume percent phenol and the phenol is at least about 2 weight percent of the hydrocarbon solvent.

4. An overbased calcium petroleum sulfonate produced according to the method of claim 1.

5. An overbased calcium petroleum sulfonate produced according to the method of claim 2.

6. The method of claim 1 wherein said overbased sulfonate is recovered from the reaction medium by heating and separation of reaction medium, followed by filtration to remove insoluble components.

7. The method of claim 1 wherein the phenol-water mixture contains from about 50 to 90 volume percent phenol and the amount of the phenol is at least about 2 weight percent of the amount of the hydrocarbon solvent, and the overbased sulfonate is recovered from the reaction medium by heating the effluent from the contacting step, and passing said effluent into a separation zone, returning reaction medium from the separation zone to the contacting step, diluting the product removed from the separation zone with petroleum solvent and filtering, discarding the filter cake comprising lime and calcium carbonate, and stripping the overbased sulfonate product to remove the added petroleum solvent.

8. The method of claim 7 wherein the amount of said phenol is between about 3 and 10 weight percent of the amount of the hydrocarbon solvent and the ratio of the phenol-water mixture is at the equilibrium ratio for the prevailing temperature.

9. The method of claim 1 which consists essentially of contacting a calcium petroleum sulfonate with calcium hydroxide and carbon dioxide in a reaction medium comprising a petroleum solvent and a phenol-water mixture containing from about 50 to 90 volume percent phenol, the amount of the phenol being at least about 2 weight percent the amount of the hydrocarbon solvent, for a time sufficient to increase the metal content of the sulfonate substantially, and recovering an overbased sulfonate from the reaction medium by heating the effluent from the contacting step, and passing said effluent into a separation zone, returning reaction medium from the separation zone to the contacting step, diluting the product from the separation zone with petroleum solvent and filtering, discarding the filter cake comprising lime and calcium carbonate and stripping the overbased sulfonate product to remove the added petroleum solvent.

10. The method of claim 1 wherein a petroleum sulfonic acid is utilized.

References Cited

UNITED STATES PATENTS

| | | | |
|---|---|---|---|
| 3,135,693 | 6/1964 | Whitney et al. | 260—504 X |
| 2,839,470 | 6/1958 | Warren et al. | 260—504 X |
| 2,695,910 | 11/1954 | Asseff et al. | 260—504 X |

DANIEL E. WYMAN, Primary Examiner

I. VAUGHN, Assistant Examiner